United States Patent [19]
Garland et al.

[11] Patent Number: 5,697,790
[45] Date of Patent: Dec. 16, 1997

[54] DISCIPLINE SYSTEM

[76] Inventors: Antonia Garland, 29812 SW Camelot St., Wilsonville, Oreg. 97070; Rebecca Tomzik, 1201 E. 27th St., Vancouver, Wash. 98663

[21] Appl. No.: 726,696

[22] Filed: Oct. 7, 1996

[51] Int. Cl.$^6$ .................................................. G09B 19/00
[52] U.S. Cl. ........................................ 434/236; 434/238
[58] Field of Search ............................. 434/236, 237, 434/238

[56] References Cited

U.S. PATENT DOCUMENTS

| | | | |
|---|---|---|---|
| 2,414,614 | 1/1947 | Shurick, Sr. ............................ | 434/238 |
| 2,863,603 | 12/1958 | Doupnik ................................. | 434/238 |
| 2,883,765 | 4/1959 | Blaine .................................... | 434/238 |
| 3,035,355 | 5/1962 | Holmes .................................. | 434/233 |
| 5,013,246 | 5/1991 | Doyle .................................... | 434/236 |
| 5,073,404 | 12/1991 | Stawski, II ............................. | 434/236 |
| 5,372,509 | 12/1994 | Brocato et al. ........................ | 434/236 |
| 5,429,373 | 7/1995 | Chelko et al. ......................... | 434/236 |
| 5,470,235 | 11/1995 | Papaleo ................................. | 434/238 |
| 5,573,407 | 11/1996 | Dunford ................................. | 434/236 |

OTHER PUBLICATIONS

"Attitudes of Primary Care Physicians Toward Corporal Punishment", magazine article by Kenelm F. McCormick, The Journal of the American Medical Association, Jun. 17, 1992, V 267, n 23, p 3161, 11 pages.

"Discipline Without Spanking", magazine article by Jenny Friedman, PhD, American Bay, Mar. 1992, p 40, 4 pages.

"Time–Out!", magazine article by Vivian Cadden, Working Mother, Apr. 1992, v 15 n 4, p 76, 4 pages.

"The Disadvantages of Time–Out", magazine article by Aletha Solter, Mothering, Fall 1991, n 65, p 38, 4 pages.

"Discipline of Children", article, Gruner & Jahr Publishing, 1992, 1 page.

"Time–Out Should You or Shouldn't You?", magazine article by Jacquelyn Mitchard and Aletha Solter, Parenting, Oct. 1994, v 8, n 10, p 69, 6 pages.

"Survey Says Some Mothers Still Believe That Spanking is Good Discipline", magazine article by Tom Fiche, Jet, Jan. 30, 1995, v 87, n 12, p 14, 2 pages.

"How Parents Discipline Their Kids", magazine article by Lisa Lombardi, Child, Mar. 1995, 6 pages.

"Smart Ways to Use Time–out: Ten Guidelines to the Best Discipline Technique Around", magazine article by Jill E. Hamilton, Parents Magazine, Dec. 1993, v 68, n 12, p 110 3 pages.

"The Truth About Time–out", magazine article by Lawrence Kutner, Ph.D., Parents, Apr. 1996, 2 pages.

"Meltdown! Staying in Control When Your Child Falls Apart," magazine article by Nancy Samalin with Catherine Whitney, Parents, Apr. 1996, 2 pages.

*Primary Examiner*—Paul J. Hirsch
*Attorney, Agent, or Firm*—Chernoff, Vilhauer, McClung & Stenzel LLP

[57] ABSTRACT

A method for a caregiver to teach discipline to a child involves the caregiver selecting a plurality of tokens in response to misbehavior of the child and instructing the child of a suitable token phrase relating to the misbehavior. The child places at least one of the tokens into a first portable container and repeats the token phrase. The child repeats the act of placing the tokens and repeating the token phrase a plurality of times.

7 Claims, 1 Drawing Sheet

U.S. Patent
Dec. 16, 1997
5,697,790
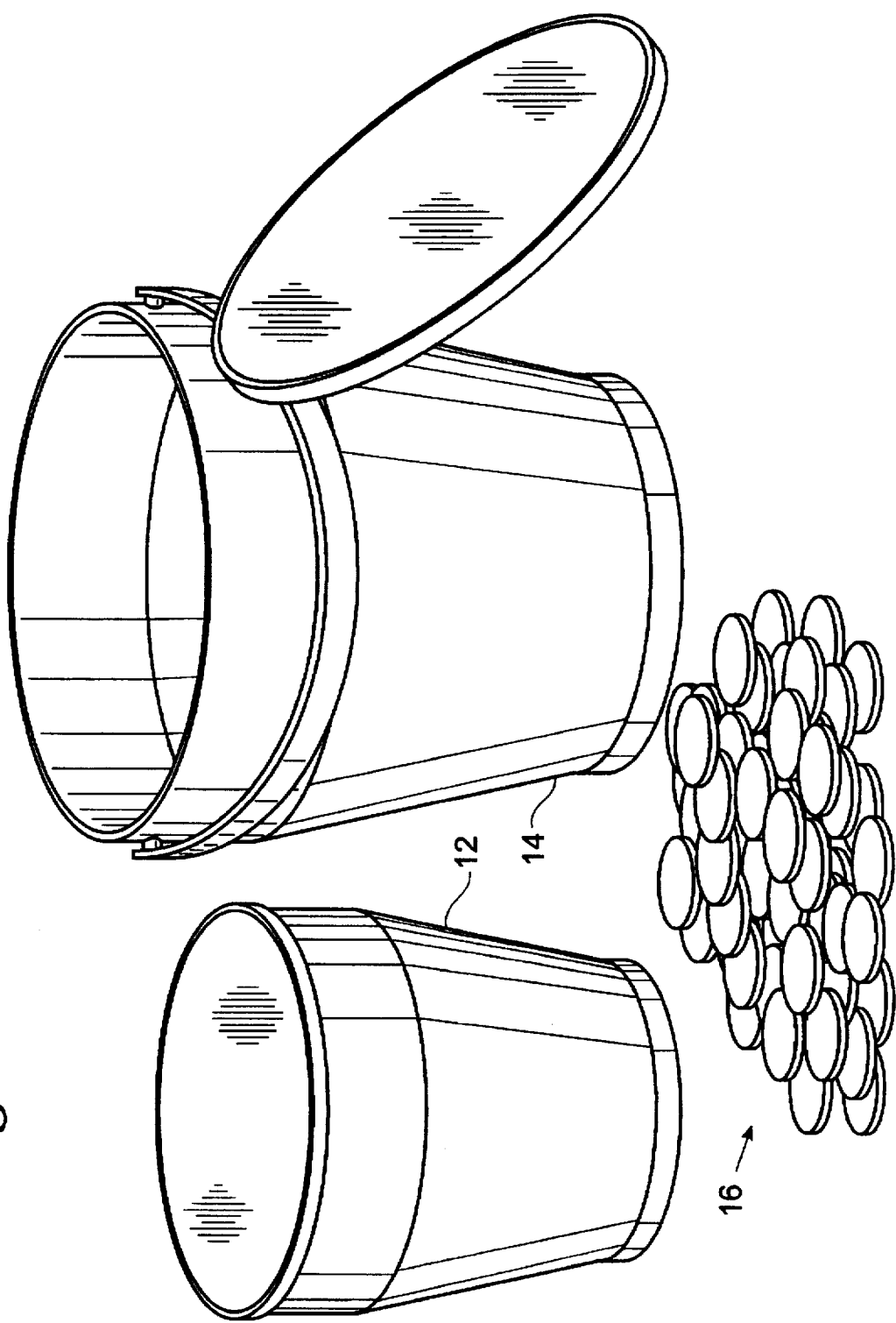
The Figure

DISCIPLINE SYSTEM

BACKGROUND OF THE INVENTION

The present invention relates to a discipline system suitable for a caregiver to teach discipline to a child.

Caregivers such as parents, babysitters, or guardians often need to discipline their charge to discourage negative behavior and prevent future repetition of the unwanted behavior. Some traditional forms of discipline are spanking, yelling, withholding of privileges, performing time-out, and ignoring poor behavior while rewarding good behavior. These traditional methods of discipline occasionally stop the poor behavior, but rarely teach good behavior. They also tend to have multiple negative side effects. Most importantly, however, these methods generally fail to prevent future repetition of negative behavior.

Using spanking as a method of discipline might deter negative behavior, but it has many negative aspects, not the least of which is a lasting negative physiological effect on the child. One problem with using spanking as a form of discipline is that it focuses on punishing the child for improper behavior without teaching the proper behavior. The lesson learned from spanking is one of fear, not that the behavior that resulted in the spanking is wrong, and not the correct behavior. Parents, as a child's primary role model, often set a poor example of the proper manner of handling one's emotions when they use spanking as a method of discipline. In the extreme, if the caregiver cannot maintain his own control, then spanking has the potential of becoming abusive. But even mild spankings promote violence by teaching a child that hitting another when angry or frustrated is acceptable behavior. A child who learns the lesson of violence from spankings is apt to mimic the violence by hitting other children or, in later life, hitting his own children. Further, spanking demoralizes the child, promotes poor self-esteem, and leaves the child feeling powerless. Finally, spanking to punish misbehavior has proven generally ineffective in teaching children proper behavior.

Yelling at the child, another method of discipline, normally occurs when a caregiver has lost control of the situation. Like spanking, yelling has severe negative aspects. Although instructive yelling might be possible, generally yelling does not have the desired effect of teaching a child proper behavior. Instead, the lesson a child learns from being yelled at is one of fear caused by the caregiver's lack of control. To constructively discipline a child the caregiver should be in the frame-of-mind of actually teaching the child proper behavior. Also, yelling often sets a poor example of how the child should handle his emotions. Overall, yelling at the child reinforces a negative focus and has proven generally ineffective in teaching children proper behavior.

Another method of disciplining the child is to withhold privileges. Withholding privileges is ineffective with young children, because the punishment is delayed which weakens the association between the misbehavior and the punishment. Also, although sometimes the withheld privilege relates to the misbehavior, often there is no association therebetween, which can be confusing to small children.

Yet another method of disciplining the child is traditional time-out. Traditional time-out involves directing the child to sit alone in a corner, banishment to a room until calm, and other methods of isolation. Although a time-out may help some children to focus on the misbehavior, many children experience difficulty calming down and focusing their thoughts on the misbehavior. Often the child placed in a time-out will become more worked up as he focuses his thoughts on self-pity, anger, revenge, and other negative feelings, as opposed to the misbehavior. As a result, the child often forgets the reason for being placed in the time-out which weakens the association between the time-out and the misbehavior. While prompt use of the time-out reinforces to the child that improper behavior will not be tolerated, it does not adequately reinforce nor teach the proper behavior.

Still another method of disciplining the child is to ignore misbehavior and only reward positive or good behavior. However, ignoring misbehavior teaches the child that improper behavior will be tolerated. Any positive results of this method are slow to develop, if at all. Further, this method does not directly address correcting the misbehavior.

What is desired, therefore, is a discipline system for use by the caregiver and the child that can be used to discipline the child while simultaneously reinforcing the proper behavior in a non-threatening positive manner.

SUMMARY OF THE INVENTION

The present invention overcomes the aforementioned drawbacks of the prior art by providing a method for a caregiver to teach discipline to a child which involves the caregiver selecting a plurality of tokens in response to misbehavior of the child and instructing the child of a suitable token phrase relating to the misbehavior. The child places at least one of the tokens into a first portable container and repeats the token phrase. The child repeats the act of placing the tokens in the container and speaking the token phrase. In the preferred embodiment the child repeats the process until all of the selected tokens are in the portable container.

The discipline system permits the caregiver to select the appropriate number of tokens based on the severity of the misbehavior and the temperament of the particular child. This permits the child sufficient time to settle down and redirect his focus on the misbehavior. Speaking the token phrase out loud causes the child to actually listen to his own words as they are spoken which provides a positive focus on the misbehavior. Overall, the discipline system reinforces the proper behavior in a non-threatening positive manner without damaging the child's self-esteem.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

The figure is a pictorial view of a discipline system, featuring two containers, and a plurality of tokens.

DETAILED DESCRIPTION OF THE PREFERRED EMBODIMENT

Referring to the figure, a discipline system 10 includes a first container 12, a second container 14, and a plurality of tokens 16. As an example, fifty tokens 16 may be used, however, the number of tokens 16 may be changed, as desired. In one embodiment, the tokens 16 are stored in the first container 12 which, in turn is stored within the second container 14. In this embodiment the first container 12 is smaller than the second container 14. It should be noted that an alternate embodiment could have both the tokens 16 and the first container 12 stored within the second container 14. Yet other embodiments could include first and second containers 12 and 14 of identical size or the second container 14 acting as a lid. Finally, the first container 12 could be larger than the second container 14.

When a child misbehaves, a parent, a babysitter, or other suitable caregiver retrieves the discipline system 10 (or has the child retrieve the discipline system 10). To use the discipline system 10 the caregiver removes the tokens 16 from the first container 12 and a chosen amount of tokens 16 are placed into the second container 14 for use by the child in learning proper behavior. To determine the number of tokens 16 to place in the second container 14, the caregiver should take into consideration the sensitivity and age of the child, as well as the severity of the misbehavior. The goal is to provide enough tokens 16 so that the child will have sufficient time to settle down and redirect his focus on the misbehavior. It has been found that fewer than fifteen tokens is usually not enough to be effective, for the process depends upon a sufficient number of repetitions, as described below. If too many tokens are selected, the child may at first calm down while using the discipline system 10, and then become angry again.

Both containers 12 and 14 are placed in front of the child and the child is instructed on a "token phrase." The token phrase is a statement that the child will repeat as he transfers each of the tokens from the second container 14 to the first container 12. The token phrase should be positive and simple, yet best stress the point that the child needs to learn based upon the particular misbehavior. This may require some creativity on the caregiver's part. For example, if it is considered inappropriate to lie, and the child is caught lying, then the token phrase could be "I will be honest." Some examples of token phrases are as follows:

I will tell the truth.

I will not hit others.

I will play fair.

I will be quiet while mom is on the phone.

I will do as I am asked.

I will ask permission before leaving the house.

I will not throw darts at others.

I will not call people names.

I will not kick others.

I will not touch dad's tools unless I ask first.

I will ask permission before playing with _____.

It may not always be possible to create a positive phrase and still present the lesson to be learned. "I will not bite others" is not a positive phrase, but it's simplicity will be more effective than "I will only use my teeth in ways that will not hurt others." The age and maturity level of the child should be considered when choosing the token phrase. Once the token phrase is selected, the child should repeat it back to the caregiver to be certain that the child understands it and can pronounce all the words.

An important aspect of the discipline system 10 is that the token phrases should be spoken out loud. By repeating the token phrase out loud, the child will essentially be verbalizing and venting his internal frustration and anxiety in a productive manner in the process of using the discipline system 10. In addition, repeating the token phrase out loud is a tremendous benefit if, for example, a four-year-old often becomes noisy and wakes up his baby sister during nap time. The token phrase could be in this instance, "I will be quiet while the baby is sleeping." This token phrase could be whispered to help the child become more familiar with his whispering voice.

In implementing the discipline system 10 the child takes one token 16 from the second container 14 and places it in the first container 12 and repeats the token phrase. The token phrase can be repeated before, during, or after placing the token 16 in the first container 12. When all the tokens 16 have been transferred from the second container 14 to the first container 12, the discipline system 10 is complete. Preferably, only one token 16 is transferred at a time, although more may be transferred if desired. It should be noted that either container 12, 14 could be provided with the tokens 16 which are then transferred to the other container 14, or a single container may be used and tokens transferred to or from it.

It is likely that during the process of using the discipline system 10 the child will begin to actually enjoy it and have fun. During this time the child shifts from a negative focus to a positive focus. No such shift is made in other, more traditional discipline methods. Once the shift is made, the child will be more likely to actually listen to his own words as they are spoken out loud. In this manner, the discipline system 10 causes the child to focus on the proper behavior, as opposed to focusing on the misbehavior. This also discourages revenge fantasies and feelings of self-pity commonly experienced during the discipline process.

No matter what the child's mood, it is essential that the caregiver offer sincere encouragement and not permit others to tease the child. This allows the child to reach an emotional calm through his own efforts. The caregiver's sincere encouragement also reinforces that the caregiver loves the child. Overall, this simplifies and clarifies the reason for the discipline while creating an open and calm atmosphere for a better learning environment.

It is not unusual for the child to resist a new disciplinary process even in the form of an enjoyable system. The caregiver should be consistent, especially when using the discipline system 10 the first time. One of the many important goals of the discipline system 10 is to encourage the child to consider, in advance, the repercussions of inappropriate behavior. Discipline truly means to teach and educate the child. With the discipline system 10, the caregiver will not only help the child develop inner discipline but will teach the child, by example, to maneuver through their feelings of frustration and anger and to exhibit proper behavior in the future.

Some variations in the discipline system 10 include the following:

More to Come: Providing more tokens.

Times Two: The child transfers tokens 16 from one container to the other as many times as the caregiver deems appropriate. This is primarily used in serious situations.

Double Trouble:

This variation is appropriate when a child has committed a pair of inappropriate behaviors such as, for example, hitting a sibling and calling a sibling a bad name. The child fills the first container 12 while repeating, "I will not hit others" and repeats the process in reverse while repeating, "I will not call people names."

IOUs: There are times that arise while the child is using the discipline system 10 and the caregiver must leave the area. At other times the child may fall asleep or the child may throw an uncontrollable tantrum. If this occurs, the caregiver counts the remaining tokens 16 and writes down the number as an IOU. As soon as the situation permits, and before the child can have any fun, all IOUs must be satisfied by finishing the discipline system 10. IOUs are also helpful when the caregiver is on the phone or visiting with company.

Tokens on the Go: Some children will take the opportunity to misbehave when away from home thinking they will not be reprimanded. The discipline system 10 is highly portable and compact so that it can be taken along and used almost anywhere (including the car, on grandma's living room floor, in a hotel room, supermarket, etc.), provided it is safe for the child.

Some children will not stay in a designated area where the discipline system 10 is being used. The caregiver must be prepared to escort the child back to the designated area as often as it is necessary until he stays put. The caregiver may also consider a "Times Two" variation in this case. The caregiver should remind the child that as soon as all of the tokens have been transferred he can get up. The caregiver should issue an IOU if things get out of control. At times the child may transfer more than one token 16 at a time, or hide them in his pockets. This behavior should be interrupted immediately upon discovery and the caregiver may need to issue more tokens 16 as a response. While using the discipline system 10, the caregiver should stay within hearing range of the child so as to assure that the token phrase is being repeated correctly and to listen for mumbling. Only the caregiver can determine when it is best to react or to ignore small indiscrepancies in the discipline system 10.

The first time that the discipline system 10 is used, the caregiver will need to clearly explain to the child how to use the discipline system 10.

When the child misbehaves, and therefore needs to use the discipline system 10, the caregiver should promptly disengage the child from whatever activity with which he is currently involved and follow the following steps:

1. Say, "It's time to use the discipline system."
2. Lead the child to a safe lighted area away from distractions, such as the television or other children.
3. Place the two containers 12 and 14 in front of the child, fill one container with the selected amount of tokens 16, and leave the other one empty (or keep unused tokens 16 in it for storage).
4. Choose the token phrase and have the child repeat the phrase back to the caregiver.
5. Instruct the child that each time he says out loud the assigned token phrase to place one token 16, and only one token 16, into the empty container. Instruct the child that the process should be repeated until all of the tokens 16 have been transferred.
6. Check the child's progress during the process and provide sincere encouragement. Keep it brief so as not to distract the child from his effort. Remember to praise the child outside of the system when he is behaving as desired. This encouragement will help motivate the child to continue to be on good behavior.
7. Some encouragement phrases may be as follows:

I am really proud of you.
Thank you for cooperating.
You are doing your token phrases so fast.
You are very impressive.
Good job.

8. The caregiver should be reminded that this is the caregiver's opportunity to relax and refocus. Take a deep breath and drop his shoulders, relax, or try one of the relaxation phrases. This will help the caregiver obtain the right frame of mind for those words of sincere encouragement to the child and relieves the pressure from the caregiver to teach a child when the caregiver may not be in the frame of mind to do so effectively.
9. Some relaxation phrases and methods may be as follows:

I will remain calm.
This moment will pass.
My child will learn to behave.
It will take time.
I feel calm, patient, and in control.
1, 2, 3, 4, 5, 6, 7, 8, 9, 10 . . .
Saying a favorite affirmation, prayer, or poem.
Visualizing being in a relaxed place.
Reading a passage from a favorite book.
Listening to a favorite song.

10. When the child has completed transferring all of the tokens 16, the caregiver should have the child put the discipline system 10 away. It is good training for the child to put things away when he is finished. This reinforces the necessity for completing a task in its entirety.
11. The caregiver can briefly discuss with the child how he might have reacted positively in the situation that precipitated the behavior. The caregiver should also remind the child that he is responsible for his actions and can exercise a choice.
12. When the discipline system 10 is finished, the caregiver should show appreciation for the child's accomplishments and move on and perhaps redirect the child to a new activity.

When finished, the child ends on a note of accomplishment which has a positive focus, rather than on escaping something that someone else has done to him.

The discipline system 10 is portable so the child can be disciplined in a consistent manner no matter where he is being disciplined.

This discipline system 10 is a complete refocusing system which encourages inner-discipline during an insecure time for the child by providing an empowering task without damaging a child's self-esteem through emphasis on correcting the misbehavior. Accordingly, the discipline system of the present invention is a non-threatening controlled method of discipline which sharply contrasts with traditional disciplinary options that are limited and often result in tears and tantrums for the child, and guilt or frustration for the caregiver.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for a caregiver to teach discipline to a child, comprising the steps of:
   (a) said caregiver selecting a plurality of tokens in response to misbehavior of said child;
   (b) said caregiver instructing said child on a token phrase relating to said misbehavior;
   (c) said child placing at least one of said plurality of tokens into a first portable container and repeating said token phrase; and
   (d) said child repeating step (c) a plurality of times.

2. The method of claim 1, further comprising the step of repeating step (d) until all of said plurality of tokens are in said first portable container.

3. The method of claim 1 wherein step (c) includes placing only one token at a time into said first portable container.

4. The method of claim 1 wherein step (c) includes said child placing said at least one of said plurality of tokens into said first portable container simultaneously with repeating said token phrase.

5. The method of claim 1 wherein said caregiver selects the number of said plurality of tokens based on the severity of said misbehavior of said child.

6. The method of claim 1, further comprising the steps of:
 (a) said caregiver filling a second portable container with said plurality of tokens; and
 (b) said child removing said at least one of said tokens from said second portable container and placing said at least one of said plurality of tokens into said first portable container.

7. A method for a caregiver to teach discipline to a child, comprising the steps of:
 (a) said caregiver selecting a plurality of tokens in response to misbehavior of said child;
 (b) said caregiver instructing said child on a token phrase relating to said misbehavior;
 (c) said child removing at least one of said plurality of tokens from a first portable container and repeating said token phrase; and
 (d) said child repeating step (c) a plurality of times.

\* \* \* \* \*